United States Patent [19]
Delatorre et al.

[11] Patent Number: 4,763,259
[45] Date of Patent: Aug. 9, 1988

[54] MEMORY PROCESSING SYSTEMS FOR WELL TOOLS

[75] Inventors: Leroy C. Delatorre, Sugar Land; Homer M. Wilson, Houston, both of Tex.; E. René Pingenot, Springfield, MO Mo.

[73] Assignee: Panex Corporation, Sugar Land, Tex.

[21] Appl. No.: 718,118

[22] Filed: Mar. 29, 1985

[51] Int. Cl.$^4$ .............................................. E21B 47/06
[52] U.S. Cl. ....................................... 364/422; 73/151
[58] Field of Search .............................. 364/420–422, 364/571; 73/151, 151.5, 152–154; 367/81; 175/24, 25, 26, 27; 324/347, 323

[56] References Cited

U.S. PATENT DOCUMENTS

| | | | |
|---|---|---|---|
| 4,033,186 | 7/1977 | Breni | 74/154 |
| 4,161,782 | 7/1979 | McCraken et al. | 364/571 |
| 4,355,365 | 10/1982 | McCraken et al. | 364/569 |
| 4,452,075 | 6/1984 | Bockhorst et al. | 73/151 |
| 4,553,223 | 11/1985 | Baihelier | 364/900 |
| 4,593,370 | 6/1986 | Balkanli | 364/571 |

*Primary Examiner*—Joseph Ruggiero
*Assistant Examiner*—Kimthanh Tbui

[57] ABSTRACT

A self-contained, down hole powered electrical system in which a well tool microprocessor and circuitry can be programmed from an external microprocessor and verified as to functional capabilities and data can be retrieved from the tool by use of a current and voltage encoded binary system. Further, the system includes an alarm system for verifying the operation of the tool.

9 Claims, 4 Drawing Sheets 4,763,259

MEMORY PROCESSING SYSTEMS FOR WELL TOOLS

FIELD OF THE INVENTION

This invention relates to oil field tools, and more particularly to testing and operation of selfcontained downhole tools for measuring parameters such as pressure or temperature over a prolonged period of time.

BACKGROUND OF THE INVENTION

Self-contained downhole tools on a wire line for measuring pressure and temperature in a borehole have been in use for some time in oil field applications. Pressure and temperature measurements in a production well over a long period of time provide significant data for analysis of the productivity of the well.

Where the downhole tool uses a contained D.C. battery pack for electrical power to the downhole measuring and recording equipment, the battery pack is a limiting factor to the period of time that downhole measurements can be made because the equipment expends the electrical power continuously. Where the electrical power is utilized intermittently by a downhole switching system, other problems occur. For example, some tools utilize memory systems for recording data which automatically erase if the power is shut off thus losing prior data. In either case, it is desirable to know prior to running the tool in the well bore that the tool is functionally ready to operate, and in a downhole operation, that the data is stored independently of electrical power to the system. It is also desirable to input and ouput data to the tool without requiring disassembly.

PRIOR ART

Relevant prior art is:
U.S. Pat. No. 4,033,186 issued 7/05/77 to Bresie
U.S. Pat. No. 4,161,782 issued 7/17/79 to McCracken

THE PRESENT INVENTION

The present invention incorporates in a self-contained downhole instrument for use in oil field production logging operations, a system for checking the integrity of the operation of the equipment prior to going in the well bore and a system for inputting and outputting data to a well tool.

The well tool instrument includes sensors for measuring parameters in a well bore and providing an electrical signal as a function of the sensed parameter to an electrical processing means. The electrical processing means includes a random access memory (RAM), a central processing unit (CPU), a non-volatile program memory and a nonvolatile data memory and a clock, all which are interconnected for an interactive interrelationship by a data bus. The clock is operated by a power supply which is powered by a battery source of energy. The processing means is also coupled via an input/output circuit to a driver circuit and an audible sound means.

The system is self-contained and when the battery pack is coupled to the instrument housing at the earth's surface, the power supply actuates the clock which operates the control to switch on power to the processing means and to initiate operation of the CPU. The CPU is operated by a pre-installed software program to check out the functioning of the entire instrument and at the conclusion of the testing program, the driver actuates an audible sound means so that the operator can be assured by an audible sound emission from the tool that it is functioning correctly prior to placing the instrument in the borehole.

The pre-installed software program is input at the surface by an independent host CPU which is coupled to the connector from an I/O circuit by first removing the sensors from the tool. The host CPU provides a voltage reference which is greater than the battery power to switch the tool CPU to a mode to receive and send data relative to the host CPU. The voltage reference $V_R$ supplies operating voltage to the tool CPU and other circuits and a voltage discriminator circuit is coupled to the tool CPU so that the host CPU can input data in binary code as a function of voltage to the CPU and to nonvolatile memory means which retain the program data and data collected independent of power to the CPU. To output data from the tool CPU, the CPU outputs data in a binary code as a function of current while the voltage is held constant. The current binary code is sensed by the host CPU for read-out. Thus, the program instructions are verified at the surface prior to running the tool.

The instrument is then positioned in the borehole for operation. The clock controls the functions under software control to periodically initiate operation of the processing equipment for a time period determined by the number of data samples to be obtained and the sampling rate for the data sensing and to turn off the processing equipment to remove power at the completion of an instruction. Thus, the downhole battery pack is utilizable over a long period of time because it only supplies power to the processing equipment when instructed to do so by program instructions to the clock. Each time the processing equipment is turned "on", the preinstalled software recording program runs through a program cycle of operations to find the last measured parameter and then records the new parameter for the time period of the next measurement. The measured parameters are processed by the RAM and stored in a nonvolatile data memory and each data measurement is applied at least twice to the nonvolatile memory When a time period of measurement is concluded and the processing equipment turned "off", the RAM memory is lost but the data is stored or retained in the nonvolatile memory.

When the tool is returned to the earth's surface, the data collected in the nonvolatile memory is read out as a current binary code by a host CPU.

DESCRIPTION OF THE INVENTION

Figure 1:
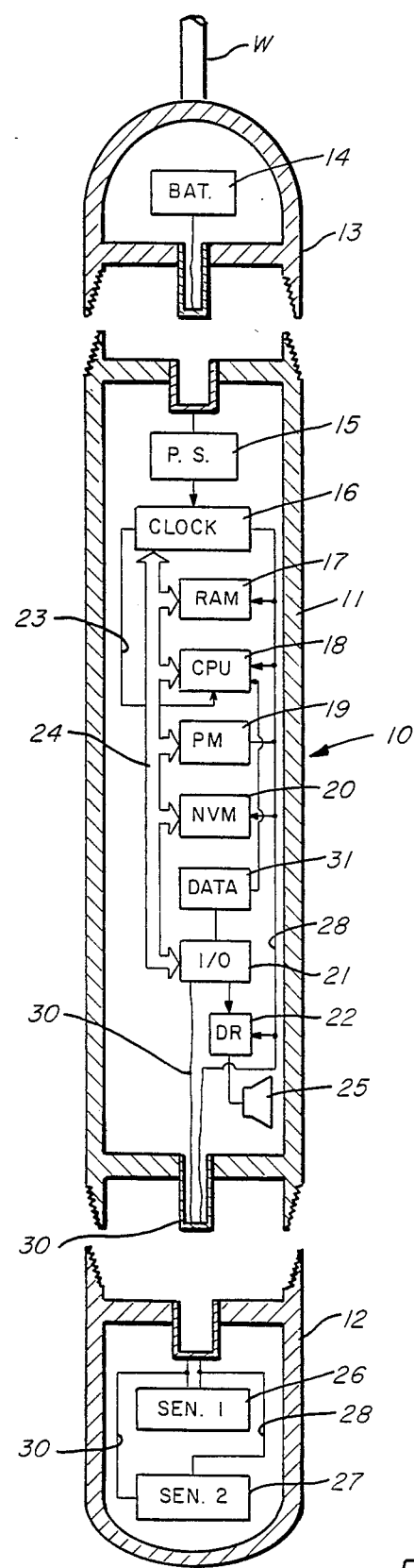
FIG. 1 is a schematic illustration of a well tool embodying the present invention.

Referring now to FIG. 1, a downhole tool 10 suitable for use in a production well for measuring temperature and pressure over a period of time is illustrated. The tool 10 includes three separate pressure and fluid tight housings 11, 12 and 13, which are typically sized for passage through a small diameter production tubing by means of a wireline W and the connecting head 13 which contains the D.C. batteries 14. The head 13 and housing 11 are independently sealed and when interconnected, the battery means 14 are electrically coupled to the electrical processing circuits within the housing 11. By separately housing the battery pack and the electrical processing circuits in the housing 11, the processing circuits are never exposed to the field environments. For example, after a test, it is only necessary to exchange batteries to run the next test. The pressure and temperature sensors are contained in a lower housing 12. Thus, when it is desired to run the sensors on an electrical wireline, they can be used independently of the housings 11 and 13.

The present invention enables testing of the equipment at the surface with new batteries to determine if the tool is functioning properly and if all of the programs and memory are proper for the next test as will be explained later.

In the housing 11 is an electronic power supply 15 which supplies electrical power to an electronic clock or timer means 16. The clock means 16 is an electronic device which functions over a period of time to periodically control the application of power to the processing equipment (shown by the line 28) and to discontinue the power to the processing equipment in accordance with a pre-selected set of preinstalled software recording instructions. Each recording instruction enables the measuring and memory circuits in the tool to operate for a time period as determined by the number of samples to be obtained and to be turned off for discrete time intervals as determined by the sample rate until the completion of the test. The time periods and time intervals can be independently set for a range or number of the program instructions. In the present invention, 32 program instructions are used, each program recording instruction establishing a time sequence for sampling a predetermined number of pressure and temperature data samples and the time interval or sampling rate between taking the next number of samples.

The clock means 16, when turned on, enables operating power to be applied to a random access memory (RAM) circuit means 17, a central processing unit (CPU) circuit means 18, a program nonvolatile memory (PM) circuit means 19, a nonvolatile data memory (EPROM) circuit means 20, an input-output (I/O) circuit means 21, and a driver circuit means 22. At the same time, the clock means 16, by a connection 23, resets the CPU 18 each time it is turned on. The clock 16, RAM 17, CPU 18, program memory 19, the I/O 21 are all interconnected by a data bus 24 which interrelates the programed functions and data transfer for the various units. An audible accoustic device 25 is connected to the driver circuit 22. A first sensor 26 and a second sensor 27 are coupled to the I/O circuit 21 by a connector 30 and the data from the sensors is in a digital format or converted to a digital format.

Figure 2A:
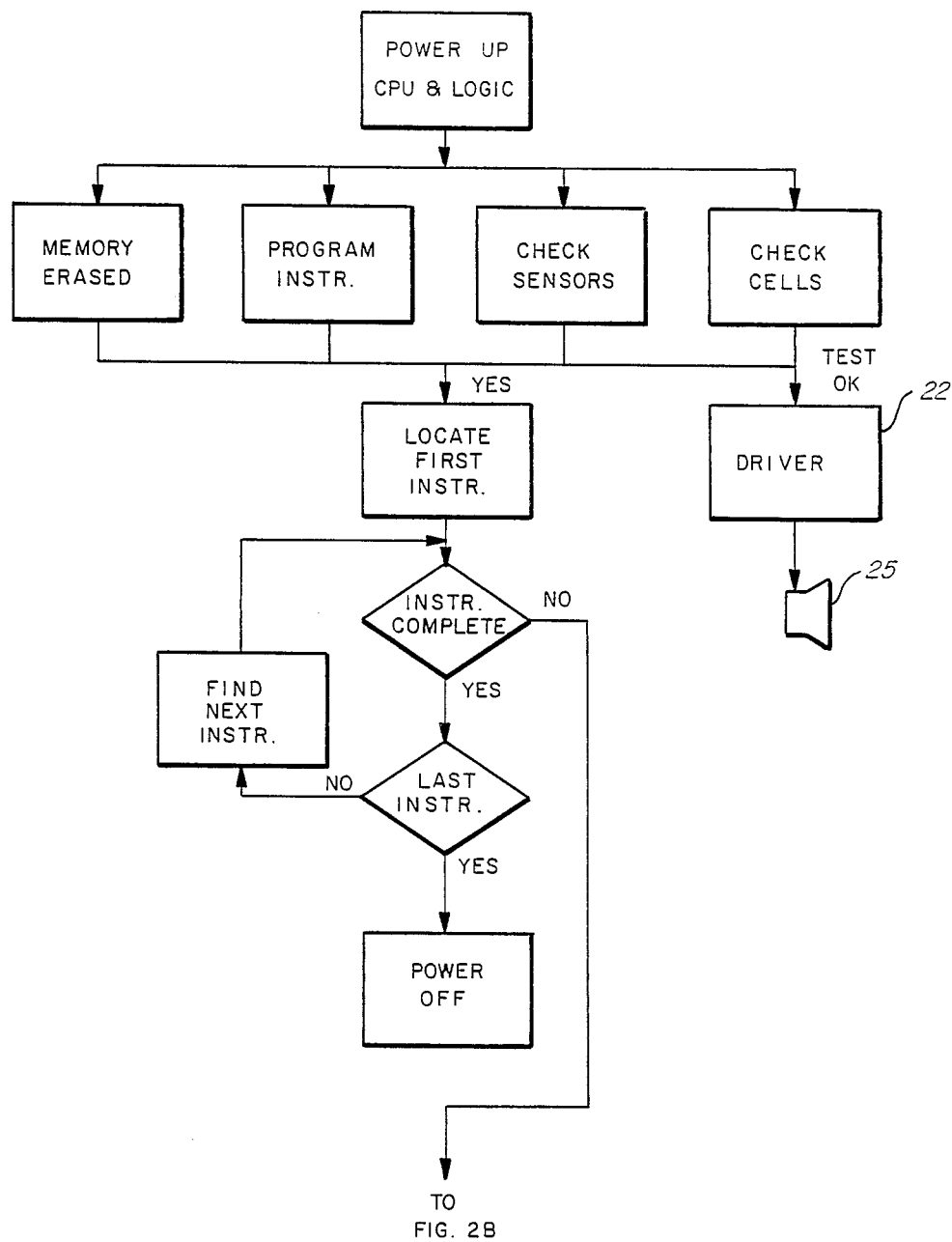
FIG. 2a, 2b and 2c are interrelated representation of a computer program.
Figures 2B, 2C:
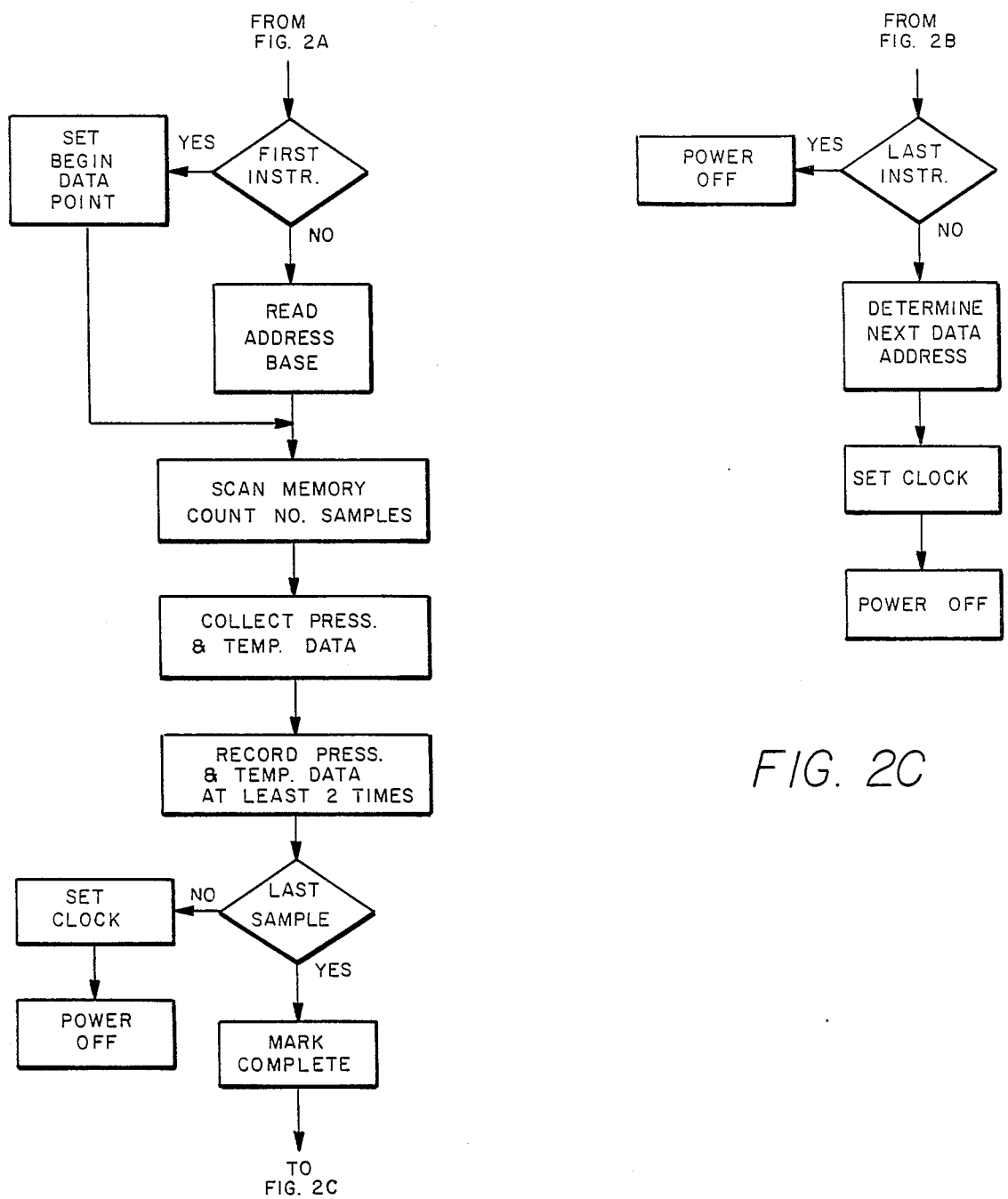

In operation of the system, the clock means 16 controls the period of time that the various units are turned off. The clock means 16 is operated by the recording program instructions which are input at the earth's surface prior to running the tool. The recording program instructions are a series of commands to operate software to control the operation of the equipment for a discrete number of sampling periods and set the time intervals between each sampling period. In each sampling period of an instruction, samples for each of the temperature and pressure data are obtained and the number of samples of each data sample is established by the instruction. The recording program instructions thus serve to direct the operating functions of the CPU to obtain data samples. The flow chart for the recording program instructions is shown in Figs. 2A-2C.

At the earth's surface, when the power is applied to the CPU and logic circuits, a program instruction to the CPU ascertains if all of the following conditions are met by the tool (See FIG. 2):

(1) that the nonvolatile memory is erased and contains no data;
(2) that the program instructions are in the CPU;
(3) that all of the memory in the system properly functions; and
(4) if the sensors are properly functioning.

If all of these functions are met or satisfied by the system, the driver circuit 22 is actuated for a one minute period to actuate the audible acoustic device 25 such as a beeper. This assures the operator, prior to running the tool in the well bore, that the batteries are operating, the processing equipment is functioning, that the memory is clear of prior data, and that the sensors are properly connected.

After completing the surface test of the equipment which determines proper functioning and the absence of any prior data from the system, the tool is positioned in the well bore. The clock is programed by the program instructions (a recording delay) to not operate for a sufficient period of time to permit location of the tool in the desired location in the well after the surface test.

Once the tool is located in the well bore at the desired depth, the clock next initiates operation of the CPU and the software program in the CPU (shown in FIG. 2) which locates the first recording program instruction of the recording program instructions.

When the first recording program instruction is located, the software checks if the recording instruction is complete, i.e. has the entire recording instruction been implemented. If the first recording instruction has been completed, the software determines if the recording program instruction read is the last recording instruction of the recording instruction program. When the last recording instruction is reached, the system power is disabled. Prior to reaching the last instruction, the recording program finds the first or next recording program instruction. For the first recording instruction the software program sets a data pointer beginning at the start of the data memory. For other recording program instructions, the software program reads the base address from the last instruction and determines the number of samples from the prior instruction reading and takes the next available data memory in the nonvolatile memory to collect the next temperature and pressure data. The collected data is processed in the RAM 17 and is recorded in a set of cells in a nonvolatile memory 20 a first time and then the data is re-entered in the same order to the same set of cells in the nonvolatile memory. If desired the data can be re-recorded more than twice. The purpose for this is that reinforcement by a second entry of the data into the nonvolatile memory insures that the nonvolatile memory adequately records the data. This is necessary because EEPROMS are reliable at ambient temperatures but at the high temperatures in a well bore the temperature limits are close to being reached. Thus, the reinforcement permits successful operation of EEPROMS at higher temperatures. After recording the sampled data, the program determines if the data collected was the last sample of the last instruction to collect data. Prior to the last instruction, the program sets the clock for the next "turn on" period and turns off the power. If the last sample of data instruction has been received or collected, the program determines if the last instruction has been completed, which turns the power off to the CPU. If the last data instruction has not been processed, the clock is set for the next operation and the power is turned off.

In the operation of the foregoing system, the software starts each time the clock turns the power on with the first programed instruction. The programed instructions functions are a series of bytes with information in a fixed array, and one of the bytes is allocated as a marker to indicate whether an instruction is finished or not. When an instruction is finished, the marker byte is used to indicate that an instruction is complete. The program instructions can, for example, consist of 10 bytes each having 8 bits. One byte is left erased as a marker or flag and two bytes are left erased as a place to store an address which is the start data address for the next instruction. The rest of the bytes contain information as to what the instruction is supposed to do.

The number of program instructions available can be 32 but not all of the program instructions need to be used. When the last instruction is completed, the equipment is disabled. Prior to reaching the last instruction the program finds the next recording instruction and determines if the instruction is complete. The program searches the memory, upon completion of an instruction, for the next available memory.

In the nonvolatile memory, it was found that EEPROMS did not reliably obtain a record of the data with a single recording at high temperatures. This is because EEPROMS are not identically responsive to input voltage levels so that data may not necessarily be impressed on the EEPROM sufficiently to provide a read-out of the data. By re-recording the data at least once on the EEPROM, the additive effect insures that the data is applied to the EEPROM for a read-out. Information concerning EEPROMS may be found in the "Electronics" Journal for June 30, 1982 as "5 volt-only EE-PROM mimics static-RAM timing" and in the "EDN" Journal for May 12, 1983 as "understand your application in chosing NOVRAM, EE-PROM".

By using nonvolatile memory, the entire processor can be turned off between sampling periods so that downhole power of the batteries is conserved and the test can be run for a longer period of time.

Figure 3:
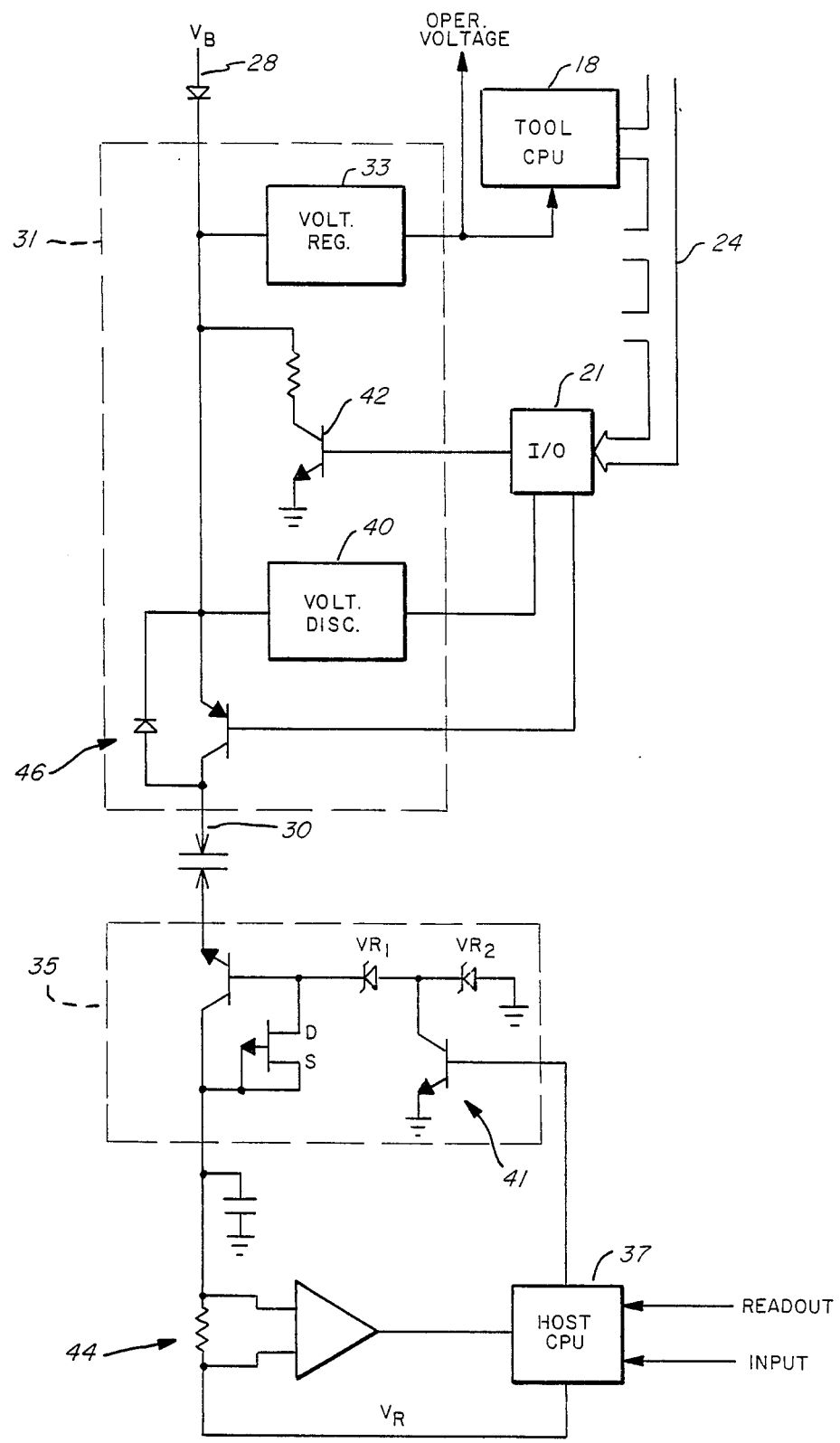
FIG. 3 is an electronic schematic off the system for inputting and collecting data from the memory in the processing equipment.

Referring now to FIG. 3, the system for inputting and collecting data from the memories in the processing equipment is schematically illustrated. As shown in FIG. 3, the tool CPU 18 is normally powered by a battery voltage received on line 28 via a blocking diode to a voltage regulator 33 which supplies a regulated voltage to the CPU 18.

To input or output data to the system, the sensor housing 12 is disconnected to provide access to the connector 30. A data communication or interface circuit 31 is interconnected between the input/output circuit 21 and the CPU 18. The data communication circuit 31 has a first voltage regulator 33 which applies constant operating voltage to the CPU 18 and as necessary to the other circuits. The constant voltage regulator 33 is supplied voltage via the connector 30 from an externally located voltage regulator 35. The voltage regulator 35 is supplied from a source of voltage $V_R$ from a host CPU 37. Thus, the CPU 37 provides an operating voltage independent of the battery source. To place the tool CPU 18 in communication with the host CPU 37, a voltage discriminator circuit 40 is coupled to I/O circuit 21. The external voltage regulator 35 includes a switch means 41 which interconnects a voltage $V_R$ or $VR_1$ to the voltage regulator 35.

The switch means 41 is operated by the host CPU 37 to encode a binary voltage input code to the voltage regulator 35 which is detected by the voltage discriminator 40 in the tool. The voltages $V_{R1}$ and $V_{R2}$ are at a higher level than the battery voltage $V_R$ which functions to place the CPU 18 in a mode to receive or send date from the CPU 18 to the CPU 37. The battery voltage 28 is not necessary for the operation.

The binary voltage input code which is input by voltage pulses representing digital 0 and 1 by programs input into the CPU 37 and the program memory, the software instruction programs and the operating program are input the tool CPU 18. Thus, the programs are placed in the tool in a nonvolatile memory which will retain the programs independent of power to the CPU 18.

During the inputting of the programs, or at the completion of the input of the software, the host CPU 37 executes a verify step which directs the CPU 18 to play back the input programs to the host CPU 37. This is accomplished by encoding the programs as a binary current code. The binary current code is obtained by a transistor circuit 42 in which the current is varied to provide the pulse code from the I/O circuit 21. Externally of the tool, a load resistor 44 detects the current changes (which are in binary code) and inputs the current code to the host computer 37 for a read-out of the program or verification of the data.

The voltage code input is, of course, operated independently of the current code output. This is accomplished by a circuit 46 which separates voltage and current signals. The system thus provides a single communication path for inputting data by a voltage code and outputting data by a current code.

After inputting the program instructions and operating instructions, the tool is ready for the surface test and subsequent collection of data downhole. After collecting the data, at the surface, the tool is again connected to the host CPU 37, where the current code is used to output the collected data to the host CPU 37 for recording and analysis.

It will be apparent to those skilled in the art that various changes may be made in the invention without departing from the spirit and scope thereof and therefore the invention is not limited by that which is enclosed in the drawings and specifications but only as indicated in the appended claims.

We claim:

1. A method for programming an internal microprocessor (CPU) means and memory means including a programmable non-volatile memory element which are enclosed within an elongated electronics housing for use in a well bore and recording pressure and temperature data and where the electronics housing is adapted to be rigidly connected at one end to an elongated sensor housing by electrical connector means in each of the housings for electrically coupling pressure and temperature sensor means in the sensor housing to the microprocessor means and memory means including non-volatile memory element in the electronics housing and adapted to be rigidly connected to an elongated battery housing at its other end where the battery housing contains batteries for providing electrical power, the method including the steps of:

prior to connecting the battery housing and the sensor housing to the electronics housing at the earth's surface, applying a conditioning reference voltage to the connector means at said one end of the electronics housing for conditioning the internal CPU means for receiving electronic data from or for sending electronic data to the connector means and for supplying operating voltage to the circuits in the internal CPU means and memory means;

inputting binary encoded data representative of a software program for the internal CPU means from an external host CPU means to the internal CPU means and the non-volatile memory element of the memory means in the electronics housing via the connector means to input the software program into the non-volatile memory element where the software program can be used to implement operation of the internal CPU means; and thereafter, while maintaining said reference voltage, reading out said binary encoded data from the internal CPU means and memory means in the electronics housing to the external host CPU means for verifying the entry of said binary encoded data to the non-volatile memory element in the memory means.

2. The method according to claim 1 wherein the connector means is comprised of two terminals and said binary encoded data is input by use of a voltage pulse mode and said binary coded data is read out by use of a current pulse mode.

3. The method as set forth in claim 1 or claim 2 and further including the step of:

at the earth's surface, rigidly connecting the electronics housing and the sensor housing to one another;

rigidly connecting the battery housing containing the batteries for providing electrical power to the electronics housing to apply power to said CPU means and said memory means and for initiating operation of the software program for issuing a first set of the binary encoded instructions for determining four criterion, i.e., if the memory in the non-volatile memory has been successfully erased, for determining if the encoded data are successfully complete and operating, for determining that the non-volatile memory cells are successfully operative, and for determining that the sensors are successfully operative; and upon completion of the operation of the first set of binary encoded instructions, actuating an internally located audible sound means for a defined period of time if the memory has been successfully erased, if the encoded data are successfully complete and operating, if the memory cells are successfully operative, and if the sensors are successfully operative, and where failure to actuate the sound means indicates a failure of one of the criterion.

4. The method as set forth in claim 3 and further including the steps of:

lowering the interconnected housings to a desired depth in a well bore for obtaining borehole data representative of pressure and temperature in another non-volatile memory element in the memory means;

periodically actuating the sensor means for inputting borehole data representative of pressure and temperature in binary code to the other non-volatile memory element;

retrieving the interconnected housings means from the well bore and disconnecting the sensor housing from the electronics housing;

applying a conditioning reference voltage to the connector means at said one end of the electronics housing for conditioning the internal CPU means for receiving or sending data to the connector means and for supplying operating voltage to the internal CPU means and memory means in the electronics housing; and reading out binary coded borehole data representative of pressure and temperature from the other non-volatile memory element to an external host CPU means for a surface read out of the binary coded borehole data from the other non-volatile memory element.

5. A method of retrieving borehole data from a well tool which senses pressure and temperature parameters in a well bore and where the well tool has an internal microprocessor (CPU) means and memory means including a programmable non-volatile memory element for collecting downhole pressure and temperature parameters in binary coded borehole data in an electronic housing and the electronic housing has connector means comprised of two terminals for coupling to a pressure and temperature sensor housing, including the steps of:

after utilizing the well tool for collecting binary coded borehole data in said memory means, disconnecting the housings from one another and applying a conditioning reference voltage signal to the connector means on the electronics housing for conditioning the internal microprocessor CPU means for sending binary coded borehole data in said memory means to the connector means and for supplying operating voltage to said microprocessor CPU means and memory means; and while said reference voltage signal is applied, transmitting binary coded borehole data from the internal microprocessor CPU means and memory means to an external host CPU means coupled to said connector means on the electronics housing for obtaining a read out of the binary coded borehole data from the non-volatile memory means in the electronics housing.

6. The method as set forth in claim 5 wherein the connector means is constituted by two terminals and said binary encoded data is read out by use of a current pulse mode.

7. An electronics sub-assembly and housing for use in a well tool for sensing pressure and temperature in a well bore traversing earth formations, where said well tool is comprised of separate interconnectable housings each having sub-assemblies and including a power source sub-assembly and housing, an electronics sub-assembly and housing and a sensor sub-assembly and housing, said electronics sub-assembly and housing including:

an elongated electronics housing having electrical connection means at one end of said electronics housing, said connection means having two electrical terminals;

internal microprocessor means and memory means enclosed in said electronics housing and coupled to said two terminals;

input/output means for processing data received from a pressure or temperature sensor means enclosed in said electronics housing, said input/output means being coupled to said microprocessor means and said memory means and being coupled to said two terminals;

conditioning means for responsive to an input reference d.c. voltage applied to said two terminals for conditioning said microprocessor means for receiving from or for sending encoded binary data to the two terminals and for supplying operating d.c. voltage to the memory means and to the input/output means for processing data;

said input/output means in said electronics housing being constructed and arranged for receiving binary encoded voltage signals representative of a software program from an external microprocessor connected to said two terminals and for applying said binary encoded voltage signals into the internal microprocessor means and memory means in said electronics housing; and said input/output means further being constructed and arranged for transmitting binary encoded current signals from said internal microprocessor means to an external microprocessor means for reading out encoded data in said memory means.

8. The apparatus as set forth in claim 7 and further including separating means in said electronics housing connected between said two terminals and said input/output means for separating binary encoded current signals from binary encoded voltage signals.

9. Apparatus for verifying the functioning of an electronics sub-assembly and housing for use in a well tool for sensing pressure and temperature in a well bore traversing earth formations, where said well tool is comprised of separate interconnectable housings each having subassemblies and including a power source sub-assembly and housing, and electronic sub-assembly and housing and a sensor sub-assembly and housing, said apparatus and housing including:

an elongated electronics housing having microprocessor means, memory means and means for processing data received from a pressure or temperature sensor means enclosed in said electronics housing where said memory means includes a non-volatile memory element having memory cells and program instructions, connector means for interconnecting said miproporcessor means, said memory means and said means for processing data and for providing first sensor terminals and first battery terminals respectively at each of said electronics housing;

an eleongated sensor sub-assembly and sensor housing having pressure and temperature sensor means coupled to second sensor terminals at one end of said sensor housing where said first and second sensor terminals interconnect when said sensor housing and said electronics housing are interconnected;

an elongated battery sub-assembly and battery housing having battery means coupled to second battery terminals at one end of said battery housing where said first and second battery terminals interconnect when said battery housing and said electronics housing are interconnected;

said microprocessor means being operatively responsive to interconnection of said battery housing and said electronics housing for determining if the program instructions in the non-volatile memory have been erased, if the program instructions are complete and operating, if the non-volatile memory cells are operative, or if the sensors are operative; and means responsive to the response of said microprocessor means for initiating an audible sound from an internal audible sound means in said electronics housing for a defined period of time if the program instructions in the non-volatile memory element have not been erased, if the program instructions are complete and operating, if the non-volatile memory cells are operative, and if the sensors are operative.

* * * * *